United States Patent [19]

Green

[11] 4,240,745
[45] Dec. 23, 1980

[54] IMAGERY WITH CONSTANT RANGE LINES

[75] Inventor: Leland D. Green, Sierra Madre, Calif.

[73] Assignee: The United States of America as represented by the Secretary of the Air Force, Washington, D.C.

[21] Appl. No.: 494,007

[22] Filed: Jul. 29, 1974

[51] Int. Cl.$^3$ .................... G01C 3/08; G01B 11/30
[52] U.S. Cl. ........................................ 356/5; 356/4; 356/371; 358/96; 358/107; 358/108; 358/109
[58] Field of Search ............... 356/4, 5, 120, 28, 371; 178/DIG. 34, DIG. 36; 358/96, 107, 108, 109

[56] References Cited

U.S. PATENT DOCUMENTS

| | | | |
|---|---|---|---|
| 3,395,608 | 8/1968 | Neill | 356/109 |
| 3,527,533 | 9/1970 | Hook et al. | 356/5 |
| 3,533,697 | 10/1970 | Hughes | 356/5 |
| 3,565,528 | 2/1971 | Witte | 356/5 |
| 3,652,161 | 3/1972 | Ross | 356/5 |
| 3,743,418 | 7/1973 | Heflinger | 356/5 |
| 3,790,287 | 2/1974 | Cuthbert et al. | 356/120 |
| 3,879,133 | 4/1975 | Mathieu | 356/169 |
| 3,897,150 | 7/1975 | Bridges et al. | 356/5 |

*Primary Examiner*—Stephen C. Buczinski
*Attorney, Agent, or Firm*—Joseph E. Rusz; James S. Shannon

[57] ABSTRACT

Method and apparatus for showing the relative range from an active line scan sensor to a target, the changes in range being shown on a recording medium as an alternate series of bright and dark lines. In particular, a modulated laser beam having high frequency components is utilized to illuminate the target, the reflected energy received at the sensor having the same modulation frequency but phase modified by the transit time required to make the roundtrip from the sensor to the target and return. The phase difference between the received energy and the transmitted, or reference, energy is detected by a phase demodulator, the detected phase difference corresponding to range contour lines. A reflectivity signal corresponding to the reflectance of the target is also provided. The range contour and reflectivity signals can be simultaneously recorded on a recording medium. Alternately, the reflectivity signal may be gated by the range contour signal producing a composite image on the medium.

Points in the image formed on the recording medium where the phase angles are the same can be made to appear white while the points where the phase angles differ by 180° can be made to appear black. The difference in the range between two black lines is equal to a specific sub-interval of the wavelength of the effective laser modulation frequency, the sub-interval being 1/n where n is the harmonic of the effective laser modulation frequency.

The scanning laser may be a mode locked laser, thereby providing a light output having a high requency components and precise frequency and phase stability.

1 Claim, 3 Drawing Figures

IMAGERY WITH CONSTANT RANGE LINES

The invention herein described was made in the course of or under a contract with the Air Force Avionics Laboratory, Air Force Systems Command, Wright Patterson Air Force Base, Ohio, Contract No. F33615-72-C-1140.

BACKGROUND OF THE INVENTION

Active line scan sensors presently utilized in the prior art make imagery of an object by directing a beam of light generated, for example, by a laser, to the object and sensing the reflected energy. The beam of light is made to scan the object periodically, similar to a flying spot scanner. Resolution of the sensor is determined by the size of the illumination spot on the object, the spot being scanned such that each resolution element on the object is illuminated one at a time. The reflection from each resolution element may be individually recorded on film or other media. The active line scan sensors described are primarily operated from an aircraft, the object being imaged being the ground and targets thereon.

The beam of light, which may be generated from a laser, scans the ground in a direction perpendicular to the path of the aircraft. For each sweep of the sensor, a narrow line equal to the width of the resolution of the sensor is scanned on each side of the aircraft. The motion of the aircraft allows successive adjacent lines to be scanned, the sensor viewing each resolution element as it is illuminated by the laser beam. Part of the optical reflected energy is detected by photodetectors in the sensor, the resulting electrical video signals being amplified, processed and used to control an optical film writing system, such as a strip map.

The prior art systems using optical techniques to measure the distance from a transmitter to a reference plane, such as described in U.S. Pat. Nos. 3,602,594; 3,446,971; 3,619,058; and 3,649,123, although providing reflectivity and distance information, do not provide imagery information, visual or otherwise, including the height, depth and/or slope of objects located at the reference plane. Further, in order to ensure accurate distance measurements with high resolution capability, the scanning laser utilized should be capable of generating light pulses of very precise frequency and phase stability, the pulse train preferably comprising relatively high frequency (harmonic) components.

SUMMARY OF THE PRESENT INVENTION

The present invention provides method and apparatus for showing the relative range from an active laser line scan sensor to a reference plane, the changes in range being shown on a recording medium, as an alternate series of bright and dark lines similar to contour lines or optical "fringe" lines. In particular, a laser beam is utilized to illuminate the reference plane, the energy which is received at the sensor having the same modulation frequency but phase modified by the transit time required to make the round trip from the sensor to the reference plane and return. The phase (angle) difference between the received energy and the transmitted or reference energy is detected by a phase demodulator, the detected phase difference corresponding to range contour lines. A reflectivity signal, corresponding to the reflectance plane, is also provided. The range contour and reflectivity signals can be simultaneously recorded on a recording medium. Alternately, the reflectivity signal may be modulated or gated by the range contour signal thereby providing a composite image on the medium. Points in the image formed on the recording medium where the phase angles are the same can be made to appear white, while the points where the phase angles differ by 180° can be made to appear black. The difference in the range between two black lines is equal to a specific sub-interval of the wavelength of the effective laser modulation frequency, the sub-interval being 1/n where n is the harmonic of the effective laser modulation frequency. The scanning laser in the preferred mode is operated as a mode locked laser thereby providing a light output having high frequency components and phase frequency and phase stability.

It is an object of the present invention to provide method and apparatus for showing relative ranges between an active line scan sensor and a reference plane.

It is a further object of the present invention to provide method and apparatus for showing the relative range of a laser scanner sensor to a reference plane on a recording medium by a series of bright and dark lines, the difference between two black lines being equal to a specific sub-interval of the wavelength of the effective laser modulation frequency, the sub-interval being 1/n where n is the harmonic of the effective laser modulation frequency.

It is still a further object of the present invention to provide method and apparatus for showing the relative range of a mode locked laser scanner to a reference plane, such as ground, the changes of range being shown on a recording medium by a series of bright and dark lines, adjacent black lines being separated by a specific sub-interval of the wavelength of the effective laser beam modulation frequency, the sub-interval being 1/n where n is the harmonic of the effective laser modulation frequency, whereby information regarding the height, depth and slope of targets situated at the reference plane may be ascertained.

It is a further object of the present invention to provide a laser scanning system which produces object range and contour information, the system, in the preferred mode, utilizing a mode locked laser.

DESCRIPTION OF THE DRAWINGS

For a better understanding of the invention as well as other objects and features thereof, reference is made to the following description which is to be read in conjunction with the accompanying drawings wherein.

DESCRIPTION OF THE PREFERRED EMBODIMENT

As will be described in more detail hereinafter, a mode locked laser generates the scanning beam utilized in the preferred embodiment of the range contour imagery of the present invention. Therefore, a brief description of the mode locked laser is set forth hereinafter.

Since optical cavity resonators (the Fabry-Perot interferometer, for example) utilized to produce laser light output are much larger than the wavelength of the signals employed therein, there are inherently multimode devices. Therefore, lasers are capable of simultaneously oscillating at a plurality of bands of frequencies whose nominal center-to-center spacings $f_c$ are given by c/2L, where c is the velocity of light and L is effective cavity length. Thus, the output spectrum from an optical laser generally consists of a plurality of spaced, discrete bands of frequencies (longitudinal modes), the amplitude and frequency thereof varying with time in a random fashion. As a consequence, the output from the laser is noisy, being randomly modulated at a frequency given approximately by the separation $f_c$ between adjacent longitudinal modes. If this situation was not corrected, it would materially limit the utility of the laser for certain purposes, such as in range determinations as described hereinabove. The stabilization of the amplitude and frequency of the longitudinal modes, however, is achieved by internally modulating the laser in a synchronous frequency. The synchronous frequency, as that term is used in the prior art, defines a frequency within a band of frequencies whose center is nominally given by nc/2L where n is an integer and L is the effective length of the cavity for the mode at the center of the Doppler-broadened gain curve, and whose bandwidth is of the order of $10^{-5}$ nc/2L.

The output of the laser, when synchronously modulated, consists of a series of pulses whose repetition rate equals the modulating frequency, i.e., c/2L. A more detailed description of mode locking is set forth in U.S. Pat. Nos. 3,412,251 and 3,648,103.

Figure 1:
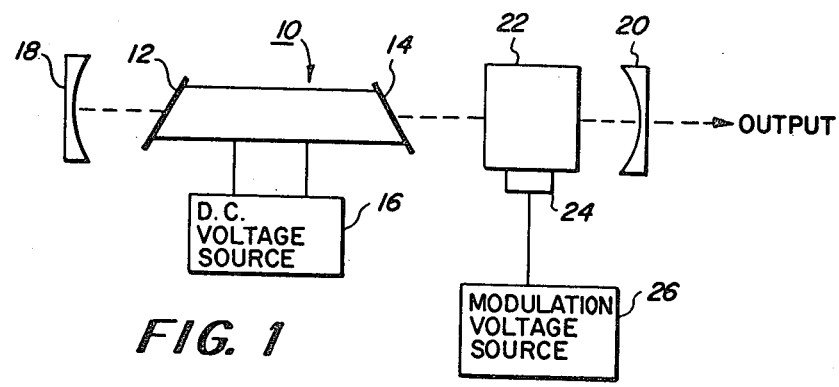
FIG. 1 is a schematic block diagram of a mode locked laser which may be utilized in the present invention.

FIG. 1 illustrates schematically a laser which may be utilized with the present invention. In particular, an argon-ion laser 10 comprises an enclosed, elongated tube having the ends 12 and 14 thereof inclined at the Brewster angle to minimize reflections. D.C. voltage source 16 is connected to the laser electrodes for supplying the power necessary to maintain a gas discharge within tube 10 for establishing a population inversion in the active medium of the laser, in this case argon. It should be noted that other laser active medium may be utilized, such as He-Ne gas lasers and solid state lasers, as well as other techniques for causing population inversion, such as optical pumping. Tube 10 is located within an optical cavity defined by mirrors 18 and 20, one of the mirrors (mirror 20 in the embodiment illustrated) being made partially transmissive such that the desired wave energy can be coupled out of the cavity through the mirror.

Located within the cavity and interposed between end 14 and mirror 20 is an acoustic-modulator 22 which may comprise a fused quartz block. An ultrasonic standing wave is induced in modulator 22 by means of ultrasonic transducer 24 mounted to the cavity wave. Source 26 comprises a tunable radiofrequency oscillator which produces a variable frequency sinusoidal modulation voltage, the modulation frequency being tuned to the laser intermode frequency ½ of c/2L to mode lock the laser. It is to be noted that the effective modulation frequency of a mode-locked laser (the frequency of the laser output beam) excited by an acoustic optic modulator is twice that of the excitation frequency of the laser. In the particular embodiment illustrated, the frequency signal applied to transducer 24 was approximately 47.2 MHz. The magnitude of the modulation voltage required to produce mode locking can be determined by standard techniques, i.e., the output of the laser can be coupled to an optical scanning interferometer and the voltage coupled to transducer 24 adjusted until the observed laser modes become stable and relatively noise free. The length of the argon laser set forth in FIG. 1 is 62.5 inches long, corresponding to an output pulse repetition rate of 94.4 MHz and mirrors 18 and 20 were dielectric coated peaked for operation at 5145 Å.

It should be noted that non-mode locked lasers can be utilized to generate the scanning light beam of the present invention such as a modulated light source, such as a gallium arsenide solid state laser wherein the input current is modulated appropriately, or an externally modulated laser. The characteristics of the scanning laser light beam which are necessary to the operation of the present invention is that the frequency and phase of the reference waveform remain constant during the time it takes for the transmitted beam to reach the target or ground and return, i.e., the transit time. Furthermore, the frequency and phase should remain relatively constant to make it possible to obtain accurate measurements, such as when the height of an object is to be measured and the object is several fringes high. Additionally, the beam should comprise high frequency components and have the capability of being amplitude modulated.

Since a mode locked laser provides high frequency components with precise frequency and phase stability, has the required beam characteristics, and provides an output beam with relatively low power input, it is the preferred laser configuration. The repetition rate of the mode-locked laser is a function of the length of the laser cavity, the phase stability being a function of the modulating source 26. The particular embodiment described hereinafter comprises a mode locked argon ion laser with a repetition rate of approximately 94.4 MHz and a pulse width of less than 250 picoseconds.

As is well known, the Fourier transform of a pulse train in the time domain is a summation of all harmonics. To obtain the results of the present invention, described in more detail hereinafter, standard radio frequency (RF) receivers were tuned to a preselected harmonic, the receivers comprising a system for detecting the amplitude modulation of the input signal. As the line scan system scans the reference plane and any targets thereat, the power returned to the sensor varies as a function of the reflectivity of the object being scanned. When tuned to the preselected harmonic of the transmitted light beam signal, the radio receivers detect the power received by the sensor at that particular harmonic and the power of the reference light beam, the detected signals being phase compared. The detected received light beam signal and the phase difference signal produce video signals which are used to drive a film recording system. If the detected received light beam signal is gated by the phase difference signal, an image, simultaneously containing range as well as reflectivity information, as well as information which can provide the vertical (or third) dimension of a scanned object which increases the accuracy of the object identification process, is produced.

The effective spacing on the object between two adjacent black lines in the imagery can be varied by utilizing a preselected harmonic. The spacing is equal to the length of the laser cavity divided by N, where N is the number of the harmonic being used. For example, assuming the effective pulse modulating frequency rate was selected to be 94.4 MHz, the eighth harmonic has a frequency of 755.2 MHz. If the length of the laser cavity is 62.56 inches, the spacing between black fringes in the imagery is 7.82 inches, and the change in range from the sensor to the reference plane is 7.82 inches.

The operation of the present invention may be better visualized by conceiving that the sensor is at the center of a series of concentric spheres each having a difference of radius of 7.82 inches for the example set forth hereinabove. A black line is produced when these spheres intersect the reference plane or objects located at the reference plane. Slope differences appear as changes in the angles of the contour lines, the interruption of the contour lines indicating that objects of different height are being scanned.

Figure 2:
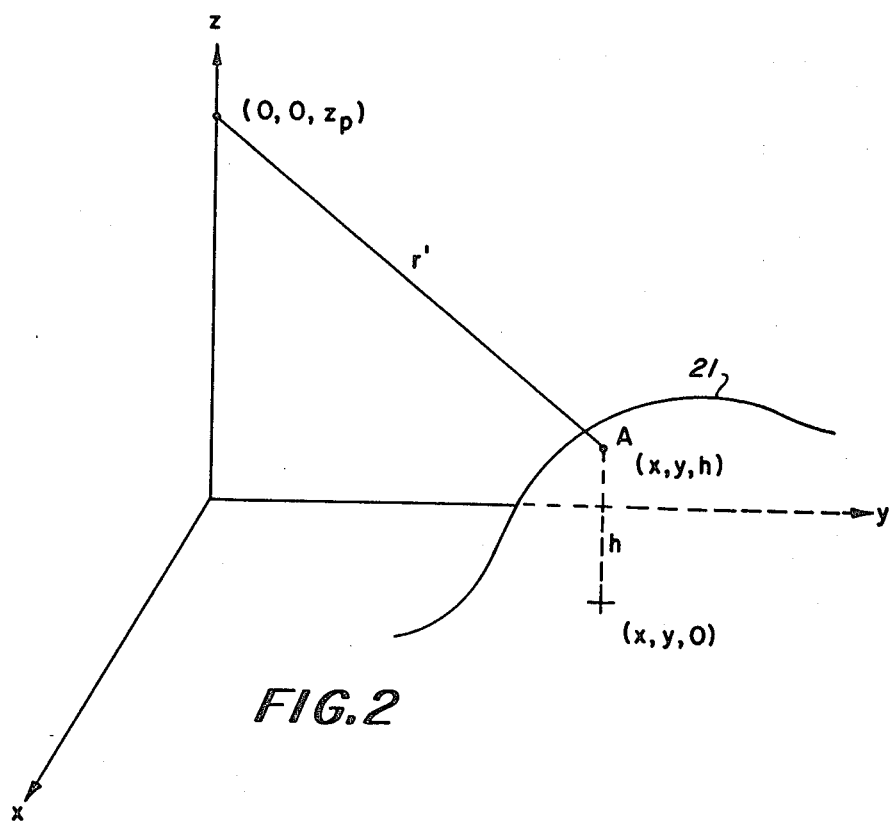
FIG. 2 diagrammatically illustrates how the present invention is utilized to provide object contour information.

Referring now to FIG. 2, an illustration showing how object contour information is ascertained is set forth.

An object 21, such as a mound, is referenced at a particular position in a three dimensional coordinate system, the coordinate system utilizing x, y and z coordinates. The laser is located at point P (O, O, $z_p$) and point A, a typical point on the surface of mound 21, is located at (x, y, h), h being the height of point A above datum plane z=0.

In general terms, an object surface, defined by the height function h=f(x,y), reflects light at point A.

Since r is the range from the laser transmitter to point A, r may be written as:

$$r=[x^2+y^2+(z_p-h)^2]^{\frac{1}{2}} \quad (a)$$

$$r=[x^2+y^2+(z_p-f(x,y))^2]^{\frac{1}{2}} \quad (b)$$

When an echo signal (reflected light beam) is returned, the values for x and y are established by well-known line scan technology; moreover the value of the laser above a datum, i.e., $z_p$, is also independently known. The contouring establishes quantized values of range $r_n$. Thus, by equation (b), local height differences in the function h=f(x,y) can be computed. Restating this, it is noted that if x, y, $z_p$ and $\Delta r$ are known, Eq. (b) permits the calculation of $\Delta h = \Delta f(x,y)$, where $\Delta r$ is an increment in r and $\Delta h$ is an increment in h.

The system will give bright to bright lines in the generated imagery for distance $\Delta r$ which are L/n apart (L is the laser cavity length and n is the number of the harmonic utilized).

Therefore, as the laser beam scans object 21, the height (or contour) thereof in relation to the datum plane x,y can be ascertained for the object surface intersected by the laser beam.

Figure 3:
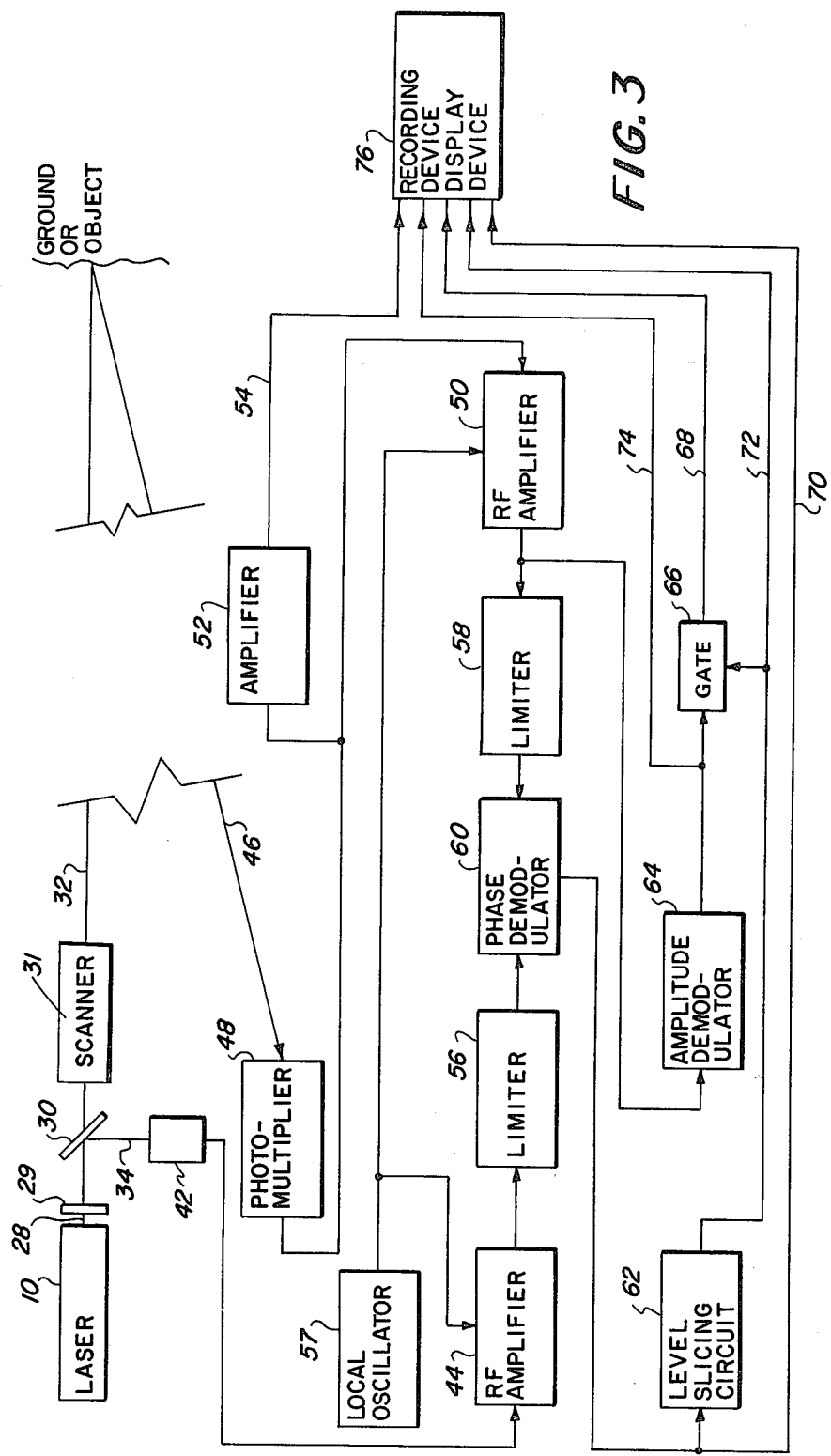
FIG. 3 is a schematic diagram of the apparatus utilized in the present invention.

Referring now to FIG. 3, a block diagram of the present invention is illustrated.

A laser 10, operated in the preferred embodiment as a mode locked laser, described in reference to FIG. 1. hereinabove generates a coherent, amplitude modulated, high frequency pulsed light beam 28 which impinges upon beam splitter 30. It is to be noted at this point that a mode locked laser is modulated internally. If an alternate source of high frequency laser light is utilized, an acoustic-optic or electro-optic modulator may be utilized to modulate the laser beam. Furthermore, any other type of high frequency modulated light source can be used, such as a current modulated solid state laser. Beam splitter 30 separates the incident light beam 28 into a transmit portion 32 and a reference portion 34 via scanner means 29. Reference portion 34 is coupled to photodetector 42, the output thereof being applied to tuned RF amplifier 44 which is selectively tuned to a desired harmonic. The transmitted optical (laser) beam 32 scans the ground or object by means of scanner 31, which could be a rotating prism as set forth in copending application Ser. No. 494,009 (the ground or object being scanned in successive increments) and the reflected optical beam 46 is applied to photodetector 48. In a successful embodiment of the invention, the output of mode locked laser 10 was amplitude modulated at 760 MHz, optical beams 28, 32, 34 and 46 therefore also being amplitude modulated at 760 MHz. As set forth hereinabove, mode locked laser 10 (or other laser configuration) may be adjusted so that alternate harmonics (frequencies) are generated. The output of photodetector 48, current modulated at 760 MHz, is coupled to tuned RF amplifier 50, tuned to the selected harmonic. The output of photodetector 48 may also be connected to low pass amplifier 52, the output thereof corresponding to a "true" reflectivity signal. The output of the local oscillator 57 which, for example, may oscillate at 730 MHz, is applied to the other input of tuned RF amplifiers 44 and 50. The frequency output of the tuned RF amplifiers corresponding to the difference between the frequency of the signals applied thereto, equal 30 MHz. The outputs of tuned RF amplifiers 44 and 50 are applied to limiters 56 and 58, respectively, which operate to remove substantially all of the amplitude variations in the difference signal. The outputs of limiters 56 and 58 are coupled to a phase demodulator 60 which detects the phase difference between the transmitted signal, at the difference frequency, and the signal, at the difference frequency, reflected from the object. The output of phase demodulator 60 may be coupled to level slicing circuit 62 which generates an output (binary) signal only when the phase difference is greater than a predetermined amount. For example, in the aforementioned embodiment, level slicing circuit 62 was adjusted to produce a signal (true) when the phase difference is 0°±10° and zero (false) for all other angles. The output of tuned RF amplifier 50 is coupled to an amplitude demodulator 64, the output thereof being coupled to one input of a gate circuit 66. The output of level slicing circuit 62 is coupled to the other input of gate 66. The output of the gate 66, on lead 68, corresponds to the reflectivity signal gated by the range contour lines (a typical recorded waveform being shown in FIG. 2). The level slicing circuit 62 therefore controls the range contour lines formed by inhibiting gate 62 when the phase difference is 0°±10°.

It should be noted that the output of phase demodulator 60, appearing on lead 70, provides basic range contour information although the interpretation thereof would be less meaningful than the range contour phase signal appearing on lead 72. Each of the signals appearing on leads 54, 68, 70, 72 and 74 can be displayed on a CRT, used to control an optical film writing system or other recording device 76, to produce an image.

In operation, reference signal 34 and received signal 46 are detected by separate photodetectors 42 and 48, respectively, in RF amplifiers 44 and 50, respectively. The RF amplifiers are tuned to a selected harmonic (frequency of laser 10) and operate to amplify the received and reference signals. The RF amplifiers are connected to local oscillator 57 and beats with the corresponding input signal to produce an intermediate frequency signal at the output thereof. The reference and received signals, shifted to the intermediate frequency, are coupled to limiter circuits 56 and 58, respectively, to remove substantially all amplitude variations in each signal. The phase relationship between the two signals is then detected in phase demodulator 60 which may comprise a balanced bridge phase domodulator. The output of phase demodulator 60 is passed through level slicing circuit 62, providing a digital output whenever the reference and received signals are within several degrees of being in phase. This signal, therefore, provides the range contour signal (alternate white and dark lines in the imagery). A grey scale video signal showing reflectivity of the object, or target, scene is obtained on lead 74 by amplitude demodulating the 30 MHz output of IF amplifier 50 in amplitude demodulator 64. This allows the system of the present invention to produce imagery with and without contour lines simultaneously (a true reflectivity signal can be obtained by amplifying the signal developed at the output of photodetector 48 as set forth hereinabove, the amplifier bandpass being from D.C. to the bandwidth of the basic video signal, 300 KHz in the embodiment set forth hereinabove). By gating the grey scale video, or reflectivity, signal with the range contour signal in gate 66, a combined grey scale and range contour image signal can be produced.

The advantages of using the electronic phase demodulator system as described hereinabove are that the contrast of the range contour lines are essentially independent of the object reflectivity (the range contour lines produced by the optical demodulation technique described in copending application Ser. No. 494,009, filed concurrently herewith, being somewhat dependent on object reflectivity). Further, reflectivity and range contour video signals can be combined in any desired manner.

As described with reference to FIG. 3, the height, depth and contour of an object at the reference plane can be readily ascertained. It should be noted that the data processing apparatus, such as a computer, may be utilized to calculate the actual range between the sensor and reference plane as well as the actual contour information of a target.

The orientation or alignment of the reference beam, it should be noted, with respect to the reflected energy from the reference plane, does not affect the results obtained in accordance with the teachings of the present invention.

In the preferred embodiment, the RF amplifiers 44 and 50 have a tuning range, for example, from 0.1 to 2 GHz which is capable of being tuned to one of the harmonics in the signal generated by laser 10.

The train of very narrow pulses generated by mode locked laser 10 is very high in harmonics. If the laser 10 is modulated at a frequency of 94.4 MHz, for example, 24 or more harmonics may be generated simultaneously. By tuning the RF amplifiers 44 and 50 to the appropriate harmonic, range contour imagery can be made using the fundamental frequency whereby the contour lines would be spaced 62.5 inches, the fourth harmonic whereby the contour spacing would be 15.6 inches or the ninth harmonic whereby the contour spacing would be 6.95 inches.

The spatial resolution of the ranging system described hereinabove is retained since it is related to the wavelength of the laser light being utilized. The range contour information is not related to the optical wavelength but the resolution thereof is a function of the laser modulation frequency.

While the invention has been described with reference to its preferred embodiment, it will be understood by those skilled in the art that various changes may be made and equivalents may be substituted for elements thereof without departing from the true spirit and scope of the invention. In addition, many modifications may be made to adapt to particular situations or material to the teaching of the invention without departing from its essential teachings.

What is claimed is:

1. Apparatus for producing a range contour map of an area consisting of spaced constant range lines with equal range differences between adjacent lines, said apparatus comprising:

a mode-locked laser producing a beam of pulsed light of highly stable pulse repetition frequency;

means for splitting said beam into first and second pulsed beams;

means for scanning said area with the first beam;

first and second photodetectors, each operating to convert an optical signal at its input into an electrical signal at its output, said first photodetector receiving said first beam at its input and said second photodetector receiving at its input the light reflected from said area as a result of said scanning;

first and second radio frequency amplifiers each having a radio frequency input and a local oscillator input and being capable of producing at its ouput a signal of frequency equal to the difference between the frequencies of signals applied to the radio frequency and local oscillator inputs, said radio frequency inputs being tuned to the same harmonic of the pulse repetition frequency of said laser;

means coupling the radio frequency inputs of said first and second radio frequency amplifiers to the outputs of said first and second photodetectors, respectively;

a common local oscillator coupled to the local oscillator inputs of said radio frequency amplifiers;

limiting means coupled to the outputs of said radio frequency amplifiers for removing the amplitude modulation of their output signals;

a phase demodulator receiving the limited signals from the outputs of said radio frequency amplifiers and producing at its output a signal of magnitude directly related to the phase difference between said limited signals;

a gate circuit having an input and an output;

means for amplitude demodulating the output signal of said second radio frequency amplifier and for applying the resulting amplitude modulation to the input of said gate circuit;

means including level sensitive means coupled between the output of said phase demodulator and said gate for inhibiting said gate whenever the phase difference between said limited signals is less than a predetermined small angle; and recording means coupled to the output of said gate circuit.

* * * * *